United States Patent

Casey, Jr.

[11] Patent Number: 5,780,186
[45] Date of Patent: Jul. 14, 1998

[54] HIGH PERFORMANCE ZINC ANODE FOR BATTERY APPLICATIONS

[75] Inventor: John E. Casey, Jr., League City, Tex.

[73] Assignee: The United States of America as represented by the Administrator of the National Aeronautics and Space Administration, Washington, D.C.

[21] Appl. No.: 649,858

[22] Filed: May 9, 1996

[51] Int. Cl.$^6$ .............................. H01M 4/42; H01M 4/66
[52] U.S. Cl. ........................ 429/229; 429/235; 429/245; 205/64
[58] Field of Search .................... 429/229, 230, 429/235, 245; 205/64, 602

[56] References Cited

U.S. PATENT DOCUMENTS

| | | | |
|---|---|---|---|
| 3,287,166 | 11/1966 | Arrance | 136/68 |
| 3,321,286 | 5/1967 | Clark et al. | 29/182.5 |
| 3,625,765 | 12/1971 | Arrance et al. | 136/75 |
| 4,377,496 | 3/1983 | Solomon | 252/425.3 |
| 4,399,005 | 8/1983 | Fritts et al. | 204/2.1 |
| 4,464,446 | 8/1984 | Berger et al. | 429/235 X |
| 4,585,716 | 4/1986 | Chalilpoyil et al. | 429/230 X |
| 4,842,963 | 6/1989 | Ross, Jr. | 429/21 |
| 4,861,688 | 8/1989 | Miura et al. | 429/230 X |
| 4,968,569 | 11/1990 | Chiba et al. | 429/229 |
| 5,132,177 | 7/1992 | Kawano et al. | 429/206 |
| 5,405,719 | 4/1995 | Sonoda et al. | 429/223 |

OTHER PUBLICATIONS

Alkaline Storage Batteries, S. Uno Falk and Alvin J. Salkind, The Electrochemical Society Series, The Electrochemical Society, Inc., New York, New York, John Wiley & Sons, Inc., 1969, pp. 111–122. (month n/a).

*Primary Examiner*—Stephen Kalafut
*Attorney, Agent, or Firm*—James M. Cate

[57] ABSTRACT

An improved zinc anode for use in a high density rechargeable alkaline battery is disclosed. A process for making the zinc electrode comprises electrolytic loading of the zinc active material from a slightly acidic zinc nitrate solution into a substrate of nickel, copper or silver. The substrate comprises a sintered plaque having very fine pores, a high surface area, and 80–85 percent total initial porosity. The residual porosity after zinc loading is approximately 25–30%. The electrode of the present invention exhibits reduced zinc mobility, shape change and distortion, and demonstrates reduced dendrite buildup during cycling of the battery. The disclosed battery is useful for applications requiring high energy density and multiple charge capability.

18 Claims, 2 Drawing Sheets

HIGH PERFORMANCE ZINC ANODE FOR BATTERY APPLICATIONS

A. ORIGIN OF THE INVENTION

The invention described herein was made in the performance of work under a NASA contract and is subject to the provisions of Section 305 of the National Aeronautics and Space Act of 1958, Public Law 85-567 (72 Stat. 435; 42 U.S.C. 4257).

BACKGROUND OF THE INVENTION

B. FIELD OF THE INVENTION

The disclosed invention relates to rechargeable Ni—Zn or Ag—Zn batteries having a negative electrode which includes a fine-pored sintered metal plaque substrate. The invention more particularly relates to the manufacture of anodes having nickel, copper or silver as the substrate material, and comprising zinc as the active material electrolytically deposited within the pores of the substrate matrix. Still more particularly, the invention relates to such zinc anodes that provide reduced zinc mobility and dendrite formation in high energy density alkaline secondary batteries.

C. DESCRIPTION OF RELATED ART

High energy density batteries, i.e., those that yield high energy relative to their weight and volume, are an important concern of the aerospace industry and the NASA space station program. A major objective in the field of high energy density batteries is the development of rechargeable, or secondary, batteries and their components that provide superior cycle life performance yet are feasible to produce and use, taking into account such considerations as cost, safety and environmental effects.

Various battery chemistries have been explored as higher energy density alternatives to conventional lead-acid batteries. Some alternative alkaline secondary batteries utilize nickel-cadmium, nickel-zinc, and nickel-metal hydride electrode combinations.

In known secondary batteries comprising zinc as the active electrode material, the low cost and relatively high energy density afforded by the zinc component is offset by the short cycle life of the battery due primarily to breakdown of the electrodes. There are two major modes of zinc electrode failure: (1) formation of zinc dendrites on recharge, with subsequent penetration of the separator, and (2) electrode shape change with consequential loss of surface area, densification of some areas of the electrode and battery capacity loss.

Upon battery recharge, zinc metal is deposited on electrode surfaces and on previously deposited zinc in the form of zinc crystals, or dendrites. Buildup of zinc on the outer surfaces of an electrode blocks access to the electrode interior and reduces the capacity of the electrode after repeated cycles of charging and discharging. Also, the zinc dendrites spread outward like a tree branch from the surface of the electrode and eventually these sharp, needle-like zinc crystals penetrate the cell separators producing internal short circuits in the battery.

Electrode shape change can be defined as the migration of zinc from the top and sides of the electrode to the bottom and occurs, in part, as the active electrode material dissolves away during battery discharge, as illustrated in FIG. 2. A conventional anode 1 consisting of zinc 2 on a sheet metal substrate 3 is shown in FIG. 2A. After use, with consequential loss of about 25% charge capacity, the zinc migration pattern shown in FIG. 2B is typically observed. With further use in a battery, to the extent that about 50% of the capacity has been lost, the zinc migration pattern has typically progressed to that shown in FIG. 2C. Swelling and deformity of zinc electrodes also occur due to the differences in volume of metallic zinc and its oxidation products zinc oxide and zinc hydroxide. As the battery goes through numerous cycles, electrode shape distorts as the zinc is redeposited in a dense solid layer, thereby providing less and less available active electrode material and preventing electrolyte access to the electrode interior. Referring still to FIG. 2A–C, it has been observed that the concentration of redeposited zinc localizes further downward on the electrode with each cycle of the battery, apparently due, in part to a concentration gradient of the dissolved zinc hydroxide. "Zinc oxide/zinc hydroxide mobility" refers to the partial dissolution of zinc in its oxide form in the potassium hydroxide electrolyte during discharge and its movement to other areas of the electrode, to the greatest extent in the lower portion, where the zinc is redeposited on charge. "Zinc mobility" is the general tendency in a zinc electrode of a rechargeable battery for the zinc active metal, during cycling of the battery, to leave certain areas of the electrode and concentrate in certain other areas of the electrode, usually the lower portion. Zinc mobility may also be contributed to by gravitational effects or potential differences, causing the lower portion of the electrode to become denser than the upper part. With repeated cycling of a conventional zinc grid electrode, the upper part of the grid will become essentially bare of zinc, as shown in FIG. 2C. In the confined space of the packed cell, such migration also results in the densification of the resulting transported zinc, loss of electrical capacity and electrode failure. It can readily be seen that the form and composition of the electrode affects how quickly an electrode will fail in use. Some electrodes have addressed these problems by creating an essentially inert electrode support structure, referred to as a substrate or matrix. For the purposes of this disclosure, the term "essentially electrochemically inert substrate" means the electromotive force for the oxidation/reduction reactions of the substrate metal is less favorable than the oxidation/reduction reactions of zinc when used as an anode substrate in an alkaline battery during discharge or recharge. Methods to decrease the mobility of the zinc oxide/zinc hydroxide during discharge have included adding Teflon® as an emulsion to the electrodes or adding aluminum hydroxide to the battery electrolyte. Conventional types of zinc electrodes usually consist of zinc metal electrodeposited or pressed onto a thin perforated copper or silver sheet or sheet of expanded metal such as Exmet (Exmet Corp.), yielding an electrode of about 65% porosity. The "porosity" of an electrode is an expression of the percentage of the geometric volume of the electrode that is open space. The conventional electrodes are prone to shape change and dendrite short-circuiting during repeated cycles of discharging and charging.

Repeated cycles of conventional zinc electrodes, therefore, reduce the active electrode area and decrease battery capacity. Since charging of the battery is usually done at a constant current, the current density on the remaining zinc area accordingly increases. This increases the dendrite growth and accelerates battery failure by dendrite penetration of the separator and consequent shorting of the battery. The two failure modes therefore act in tandem.

To a certain extent, dendrite penetration can be controlled by the choice of semipermeable separator material used to separate the positive and negative electrodes, by the weight of the material, and by the number of separator layers. However, providing additional or heavier layers of separator material also increases the size and weight of the battery.

In addition to the electrode shape change produced by zinc mobility, repeated swelling and contraction of the zinc electrodes also occurs due to the differences in volume of metallic zinc and its oxidation products, zinc oxide and zinc hydroxide. This contributes to the zinc mobility, or shedding, phenomenon.

A large-pored substrate for a zinc electrode is disclosed in U.S. Pat. Nos. 3,287,166 and 3,625,765 (Arrance) in which a sponge made of certain organic material is saturated with a solution of nickel, copper or silver, together with a plastic binder material that reduces sagging and distortion of the electrode. Upon heating, the sponge material decomposes leaving a large-pored sintered metal matrix. Zinc or zinc oxide is then pressed or vibrated into the pores of the matrix. This relatively large-pored type of substrate, with pore diameters of about 0.01 to about 0.05 inch (0.25–1.27 mm), does not, however, sufficiently limit zinc mobility or dendrite formation. The "pores" of an electrode are the discrete spaces defined by the sintered metal substrate, or where the context indicates, by the sintered metal substrate after loading with active electrode material.

Sintered metal plaques have been used as electrode substrates, but have not generally been employed for use with zinc as the active material. U.S. Pat. No. 4,377,496 (Solomon), for example, describes a method of preparing a porous sintered metal plaque for use as a gas diffusion electrode substrate. The active electrode material is deposited as a layer on the surface of the metal plaque and employs zinc simply as a pore former which is leached out later in order to form a silver plaque substrate for a carbon cathode.

U.S. Pat. No. 3,321,286 (Clark) relates to a carbon electrode for a fuel cell comprising a sintered nickel or silver powder substrate having a specified pore size of 4.5–6.1µ. This type of electrode is not suitable for use in a zinc-type secondary battery.

U.S. Pat. No. 4,399,005 (Fritts) discloses a nickel hydroxide electrode for use in a nickel-cadmium alkaline battery. A small-pored sintered nickel plaque substrate is electrolytically impregnated with a small amount of zinc hydroxide to improve charge retention and chargeability at high temperature. Because zinc does not serve as the active electrode material, zinc electrode shape change and dendrite formation are not addressed.

U.S. Pat. No. 5,132,177 (Kawano) discloses another nickel hydroxide electrode to which zinc is added in small quantities to suppress expansion of the electrode cathode plate. A sintered nickel plaque substrate having 85% porosity is electrolytically impregnated with small amounts of zinc and copper along with a large amount of nickel oxide, which serves as the active material. Again, this electrode does not address the particular problems associated with zinc-type rechargeable batteries.

U.S. Pat. No. 4,968,569 (Chiba) relates to zinc electrode substrates of lead or lead alloy coated electroconductive material in the form of thin plates, sponge or mesh. No plaque substrates are considered. In addition, the electrodeposition of zinc using an aqueous solution of zinc nitrate is a surface coating rather than deposition within the pores of a substrate as in the case of plaque. The process is concerned with an anode primarily for zinc-manganese dioxide cells with weakly acidic battery electrolyte.

In certain electrodes utilizing zinc as the active electrode material, obtaining the desired high porosity matrix is typically managed by plating the substrate with zinc by electrodeposition using an alkaline zinc solution and a high current density. "High current density" generally refers to a zinc electroplating current of greater than 1 ampere per square inch. This produces a porous spongy zinc deposit having the necessary high surface area. It would be desirable to avoid the need for high plating current in zinc electrode production.

U.S. Pat. No. 4,842,963 (Ross, Jr.) discloses a zinc electrode having a large-pored copper metal foam substrate. The outer electrode surfaces are coated with an inert material such as Teflon® to inhibit dendrite formation. Zinc active electrode material is deposited electrolytically from an acidified zinc sulfate solution onto the inner surfaces of the foam substrate. The 90–95% porosity and pore size of about 5–300 microns in diameter, however, do not deter zinc mobility or electrode shape change upon recharge. This zinc electrode is used in a zinc-air battery in which the electrolyte is freely circulated, thus increasing the mobility of the zinc oxide/zinc hydroxide during discharge. The foam metal pores measured 5–300 microns and had a surface area of 25 $cm^2/cc$. This provided a limited surface area compared with that obtained with plaque which is 85% porous, i.e. 0.25–0.50 $m^2/gm$ or 3,337–6,667 $cm^2/cc$. The more open structure of the foam substrate of this electrode has lower physical strength as concerns resistance to shock, vibration, and acceleration.

Certain alkaline zinc batteries have made significant strides in some of the above-named areas. For example, silver-zinc batteries have high energy density and power density, but do not have the safety problems of certain high energy density lithium batteries. Nickel-zinc batteries have a higher energy density than nickel-cadmium batteries and substitutes the less toxic zinc for the highly toxic cadmium. Essential problems of limited rechargeability and insufficient cycle life, however, remain to be solved. The extent of a zinc battery's ability to be repeatedly discharged and charged is determined by how soon an electrode will fail due to the way that zinc is laid down during battery recharge, the morphology the zinc takes during recharge, the restriction of zinc oxide/zinc hydroxide mobility during discharge, and the rate at which shape change takes place.

Accordingly, despite the many advances in the development of high current density batteries over the last two decades, further advances are needed, particularly for aerospace and space station applications. Specifically, there is an as yet unsatisfied need for batteries having the following combination of characteristics: high capacity, high power, rechargeability, long discharge/charge cycle life, minimum size and weight, economical to manufacture, and environmentally safe.

SUMMARY OF THE INVENTION

The zinc alkaline batteries of the present invention provide rechargeable Ag—Zn or Ni—Zn batteries with high energy and power density, longer cycle life, practical size and weight requirements, and moderate cost materials that are environmentally feasible to use. The negative electrode of the present invention postpones electrode failure by retarding shape change by minimizing zinc mobility and electrode densification during battery discharge/charge cycles and by deterring zinc dendrite formation. In so doing, the present invention overcomes certain failures of other batteries.

The electrode of the present invention addresses the problems of zinc electrode shape change and dendrite formation during battery cycling by providing a fine-pored sintered nickel, copper or silver plaque substrate having zinc compactly deposited within the pores of the matrix. For the purposes of this disclosure, "fine-pored plaque" means a sintered metal substrate, or matrix, prepared from metal powder having an average particle size of 3 microns (as measured by Fisher Sub-sieve Sizer) and having a pore diameter in the range of 4 to 15 microns.

A fine-pored sintered nickel, silver or copper powder plaque which is about 80–85% porous is loaded with zinc by immersing the sinter in a slightly acidic zinc nitrate solution. "Porosity" of the plaque, or matrix, expressed as a percentage, is 100% minus the volume of metal in the sintered plaque. For example, 85% porosity means that 85% of the geometric volume of the plaque is open space.

Accordingly, there is provided an electrode having an essentially electrochemically inert substrate of nickel, copper or silver and having zinc as the active electrode material. The substrate comprises a fine-pored sintered plaque formed from metal powder having an average particle size of about 2 to 3.5 microns. The essentially electrochemically inertness of the sintered substrate is established by the relative positions of the substrate metal versus zinc in the electromotive series, when the electrode is used with a suitable counterelectrode in an alkaline battery during discharge or recharge. In the electrode of the present invention, zinc is alloyed with approximately 1–2% mercury, lead, tin or thallium.

The fine-pored sintered plaque has a surface area of about 0.25–0.50 sq. meters per gram of substrate available for zinc deposition. Nickel, copper and silver are desirable substrate materials because they each demonstrate high electrical conductivity, are resistant to corrosion in an alkaline electrolyte environment, and demonstrate an electrochemical potential that is considerably distant from that of zinc. Zinc is especially desirable as an electrode material because it has a high half cell voltage, is readily available and inexpensive and has low toxicity. The zinc is preferably loaded into the pores of the plaque by electrochemical deposition from a weakly acidic solution of zinc nitrate, reducing the zinc electrochemically using low current density, taking advantage of the high surface area of the plaque to impregnate the plaque with a high surface area zinc layer as the active electrode material. The low current plating allows the zinc to be plated within the pores of the plaque, comprising a large surface area. The multiplicity of pores and the highly tortuous paths within the resulting matrix then limits the mobility of the zinc oxide/zinc hydroxide during the discharge in a battery and thereby retards the migration of zinc, which is equivalent to shape change in a conventional electrode. Thus the cycle life of the battery is extended.

The preferred embodiment comprises an electrochemically inert plaque substrate with an original pore size in the range of 4–15 microns which is loaded with zinc to the extent that the residual porosity is about 25–30%. "Residual porosity" or "final porosity" of an electrode is 100% minus the combined volume of substrate metal and active material of the electrode. A final porosity of 25–30% allows for the volume change when zinc is converted to zinc oxide during discharge.

Also provided is a process for making the above-described electrode which includes mixing a quantity of nickel, copper or silver powder of about 2–3.5μ average particle size (as measured with Fisher Sub Sieve Sizer) with a suitable amount of water and carboxymethyl cellulose and spreading the resulting slurry onto a moving belt. The slurry is conveyed into a hydrogen furnace where it is subjected to conditions of reducing atmosphere and high temperature sufficient to vaporize the water and carboxymethyl cellulose and to sinter the metal powder, producing a metal matrix that is approximately 85% porous, about 0.01 to 0.07 inch thick and has pore diameters in the range of about 4 to 15 microns. The protoelectrode is formed by cutting the sintered plaque to suitable electrode dimensions. For the purposes of this disclosure, the term "protoelectrode" refers to an unfinished, or predecessor form of the disclosed electrode, or, if the context permits, to the finished electrode prior to being used in a battery. The protoelectrode is immersed in a weak acidic aqueous solution of 50–60% zinc nitrate, suspended by an electroconductive tab welded to the matrix at a point near the top edge. The weakly acidic zinc nitrate solution is adjusted to pH 5–5.5. Air bubbles are removed from the plaque by briefly drawing a sufficient vacuum on the electroplating bath. In a certain embodiment, using a stainless steel counterelectrode, zinc is electrochemically deposited within the pores of the plaque at a current rate of about 0.75 to 1.0 Amperes per square inch while maintaining the solution at pH 5.0–5.5 and 50°–80° C., and turning off the current for about one minute approximately every ten minutes to allow the solution to refill the pores. Zinc electroplating is continued until the protoelectrode contains about 45–55% zinc relative to the weight of zinc plus substrate metal and the protoelectrode is about 25–30% void. After being washed in water until the plate is at a neutral pH, the protoelectrode is submerged in a dilute solution of mercuric acetate until the amalgamation level is 1–2% mercury relative to the zinc, whereupon the plated protoelectrode is again washed with water and then dried at about 100° F. in a forced air oven. The mercury is added to the zinc to minimize the hydrogen evolution when the plate is incorporated in a battery. Although mercury is preferred, other heavy metals such as lead, tin or thallium may be used.

A battery employing the disclosed electrode is also provided wherein one or more of the electrodes serve as anodes, alternately stacked next to a suitable positive electrode, such as nickel oxide or silver oxide. The anodes and cathodes are separated by suitable semipermeable separator layers positioned between the positive and negative electrodes, and the battery employs an alkaline aqueous electrolyte solution such as potassium hydroxide. The energy density of a cell made according to the present invention is not impaired by substitution of nickel, copper or silver plaque for a conventional anode grid of expanded copper or perforated copper sheet. The anode contribution to the energy density of the cell in the case of the plaque-based anode is comparable to that of a conventional zinc electrode based on expanded metal or perforated sheet, and the residual porosity after zinc loading provides space for the increased volume of zinc oxide that results during discharge.

The rechargeable battery of the present invention, employing the zinc anode disclosed herein, will find particular application where light weight relative to contained energy and high power is required such as portable industrial equipment. It will also find particular use in medical instruments, aircraft and military applications.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 2 is an elevational view of a conventional zinc anode having a sheet metal substrate.

DETAILED DESCRIPTION OF THE PREFERRED EMBODIMENT

Figure 1:
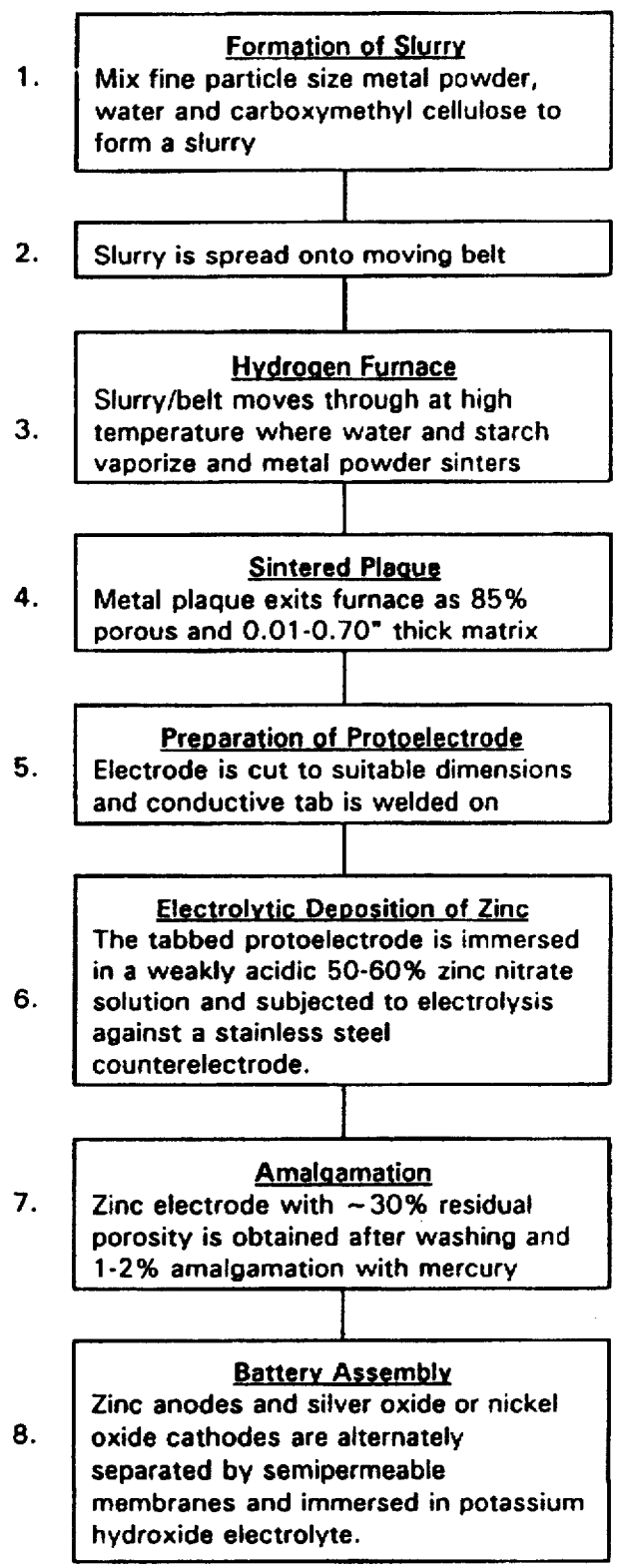
FIG. 1 is a flow chart summarizing how the zinc anode of the present invention is made.
Figure 2A:
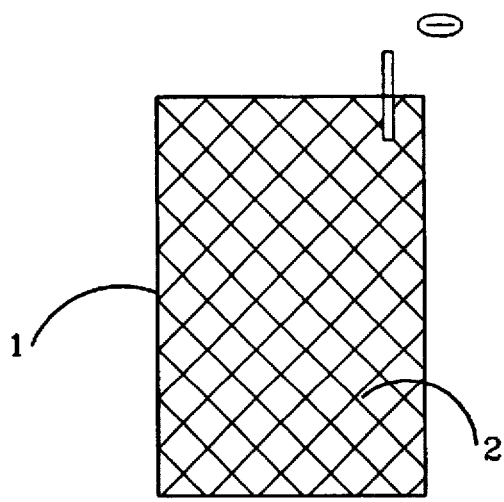
FIG. 2A shows the fully zinc-loaded anode prior to use.
Figure 2B:
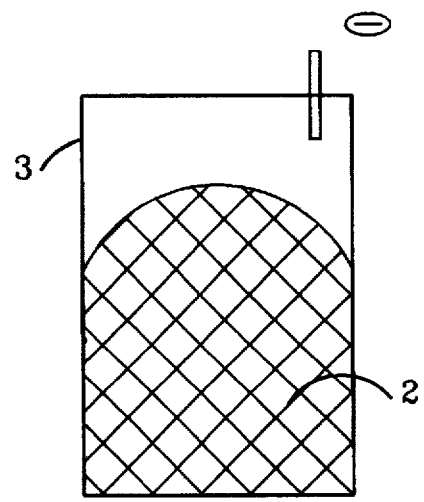
FIG. 2B shows the zinc shape change after use in a battery and about 25% capacity loss.
Figure 2C:
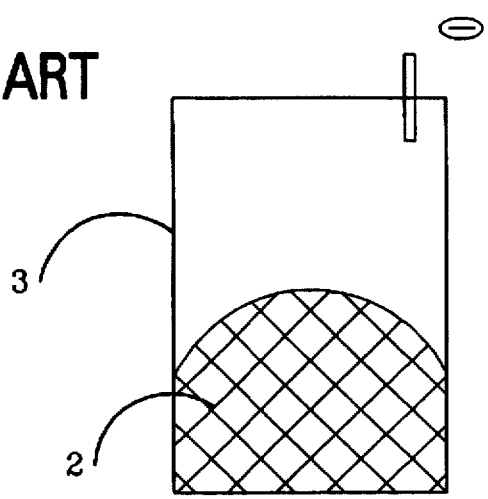
FIG. 2C shows zinc migration pattern of the same anode after about 50% capacity loss.

Referring initially to FIG. 1, the electrode of the present invention is prepared as follows:

Forming the Protoelectrode

A quantity of fine metal powder (2–3.5μ average particle size), preferably silver, copper or nickel powder is prepared by reducing the metal carbonyl gas by heating in accordance with conventional techniques, is prepared electrolytically, or by any other method that produces a suitable metal powder of the specified size range. Suitable nickel powder of average particle size 3μ (determined by Fisher sub-sieve sizer) Cat. No. 26,698-1, is available from Aldrich Chemical Company, St. Louis, Mo. Suitable dendritic copper powder, of about 3μ particle size, Cat. No. 35,745-8, and silver powder, 2–3.5μ average particle size, Cat. No. 32,708-6, are available from the same company.

A plaque is made from the metal powder by a modification of standard methods known in the art, such as those used for conventional nickel plaque electrodes in the manufacture of nickel-cadmium cells. (S. Uno Falk and Alvin J. Salkind, "Alkaline Storage Batteries." Wiley-Interscience, NY, N.Y., 1969, pp. 111–122.) The preferred method for making a metal plaque electrode is described below.

As schematically shown in Step 1 of FIG. 1, a mixture of fine particle size metal powder, water and carboxymethyl cellulose is spread onto a moving belt (Step 2). This slurry is made by combining equal weights of the metal powder and an aqueous solution of 1–5% (w/w) carboxymethyl cellulose. Carboxymethyl cellulose is preferred, but starch or other similar materials may be used. In Step 3, the slurry layer is conveyed into a hydrogen furnace and subjected to a reducing atmosphere to maintain the plaque metal in its unoxidized state and high temperature, preferably 800°–1000° C. for 5–20 min., whereupon the water and carboxymethyl cellulose vaporize and the metal powder sinters. The sintered plaque, also referred to as a matrix, that exits the furnace (Step 4) is approximately 85% porous, about 0.01 to 0.07 inch (0.25–1.78 mm) thick and has pore diameters in the range of about 4 to 15 microns. The proportions of the slurry components may be varied, if desired, so long as the sintered metal matrix has the specified characteristics of approximately 80–85% porosity, about 0.01 to 0.07 inch (0.25–1.78 mm) thick and pore diameters in the range of about 4 to 15 microns providing a surface area of about 0.25–0.50 sq. meters/gm metal available for zinc deposition. As schematically shown in Step 5, the sintered matrix is then cut to suitable electrode dimensions and an electrically conductive tab is welded to the top edge, forming the protoelectrode.

Electrolytic Loading of Zinc

In Step 6 of FIG. 1, the plaque matrix is then loaded with zinc in a manner that provides tight, even packing of the zinc into the porous matrix. This is preferably done by electrochemical deposition in which the tabbed matrix, or protoelectrode, is immersed in an aqueous solution of 50–60% zinc nitrate at pH 5–5.5. A vacuum of approximately 20–30 Torr is pulled on the solution for about 5–10 minutes to eliminate air bubbles within the pores. Using a stainless steel counterelectrode, zinc is then electrochemically deposited within the pores of the plaque at a current rate of about 0.75 to 1.0 Amperes per square inch, maintaining the pH at about 5.0–5.5, and turning off the current for about one minute about every ten minutes to allow the solution to refill the pores. The temperature of the bath can be raised to 50°–60° C. and the vacuum may vary, as long as boiling of the electrolyte solution is avoided. This low-current plating in weakly acidic zinc nitrate solution is continued until the protoelectrode contains the maximum amount of zinc that will permit adequate penetration of the electrolyte solution when the electrode is employed in a battery. Preferably the finished electrode is 45–55% zinc (by weight) and 25–30% void. The 25–30% residual porosity provides space for the formation of the less dense zinc oxide/hydroxide during the battery discharge cycle.

Alloying with a Heavy Metal

The wet plate is immediately washed in flowing deionized water until the plate is at approximately neutral pH, as measured directly on the surface of the plate. It is then preferably immersed in a dilute solution of mercuric acetate, as shown at Step 7 of FIG. 1. Mercury is added by amalgamation in order to minimize the hydrogen evolution when the anode is used in a battery. This is done until the amalgamation level is about 1–2% mercury relative to the zinc. Although mercuric acetate is preferred, a salt of another heavy metal (such as lead, tin or thallium) that is capable of lowering the hydrogen evolution when the electrode is used in a battery may be substituted for mercury. After removing the plated electrode from the amalgamating bath, it is again washed and then dried at about 100° F. in a forced air oven.

Battery Construction

Referring to Step 8 of FIG. 1, a silver-zinc or nickel-zinc battery using the improved zinc-loaded plaque anode is assembled by combining a multiplicity of alternating positive and negative electrodes that are stacked together, each separated by several layers of nonconducting separator material, such as a semipermeable membrane. The positive electrode maybe silver oxide or nickel oxide and is prepared by conventional means known to those of skill in the art. The positive electrode is wrapped in a layer of nonwoven polyvinyl alcohol (PVA, Dexter Paper Co.) or nylon (Pellon®), and then over-wrapped in 3 to 5 layers of cellophane. A microporous polyethylene or polypropylene layer may also be included in the wrap. The resulting stack is inserted in a rigid plastic (e.g., acrylonitrile butadiene styrene (ABS) or Plexiglas™) cell case and activated by the addition of 40–45% potassium hydroxide electrolyte.

When assembled into a battery, the physical form of the anode of the present invention is maintained by the sintered nickel, copper or silver matrix. The very fine-pored plaque matrix and controlled zinc impregnation of the improved anode permit the battery of the present invention to perform in a manner superior to other secondary batteries. Reduced dendritic shorting and extended cycle life are observed compared to known zinc alkaline secondary batteries.

While a preferred embodiment of the invention has been shown and described, modifications thereof can be made by one skilled in the art without departing from the spirit of the invention.

What is claimed is:

1. An electrode comprising an essentially electrochemically inert substrate chosen from the group consisting of nickel, copper and silver, and an active material comprising zinc alloyed with approximately 1–2% of a heavy metal chosen from the group consisting of mercury, lead, tin and thallium, said substrate material being a sintered plaque comprising a multiplicity of pores, said pores comprising electrochemically deposited zinc.

2. The electrode of claim 1 wherein the sintered plaque has a surface area of about 0.25–0.50 sq. meters per gram of substrate available for zinc deposition.

3. The electrode of claim 1 wherein a weakly acidic solution of zinc nitrate is the source of said zinc.

4. The electrode of claim 1 wherein said zinc loaded plaque has a porosity of about 25–30%.

5. The electrode of claim 4 wherein said pores are essentially filled with zinc oxide and/or zinc hydroxide upon discharge of a Ni—Zn or Ag—Zn alkaline secondary battery employing said electrode as an anode.

6. An electrode for an alkaline secondary battery comprising:
an essentially electrochemically inert substrate material chosen from the group consisting of nickel, copper and silver, said substrate material being in the form of a sintered plaque having a pore size of about 4–15 microns and having a surface area of about 0.25–0.50 sq. meters per gram of substrate material available for zinc deposition; and
an active electrode material comprising zinc electrolytically deposited within the pores of said sintered plaque, said zinc being alloyed with approximately 1–2% of a gas-evolution suppressing metal chosen from the group consisting of mercury, lead, tin and thallium, said zinc-loaded plaque having a residual porosity of approximately 25–30%, and said zinc being deposited within said substrate such that said pores become essentially filled with zinc oxide and/or zinc hydroxide when the electrode is discharged during use in a Ni—Zn or Ag—Zn alkaline secondary battery.

7. An improved zinc electrode comprising a porous sintered plaque substrate wherein the improvement comprises a finely pored plaque formed from metal powder chosen from the group consisting of nickel, copper and silver and having an average particle size of about 2 to 3.5 microns, said improved electrode further comprising zinc evenly deposited in the pores such that the pores become essentially filled with zinc oxide and/or zinc hydroxide upon discharge of a Ni—Zn or Ag—Zn alkaline battery employing said electrode as an anode.

8. The electrode of claim 7 wherein said zinc is alloyed with about 1–2% of a gas-evolution suppressing metal chosen from the group consisting of mercury, lead, tin and thallium.

9. A process for making an electrode comprising:
sintering metal powder chosen from the group consisting of nickel, copper and silver, said powder having an average particle size of about 2–3.5μ to form a plaque having about 4–15μ pores and about 80–85% porosity;
electroplating said plaque in an aqueous solution of zinc nitrate at pH 5–5.5 until said electrode is about 45% zinc and at least 25% void.

10. The process of claim 9 further comprising:
mixing said metal powder with sufficient water and carboxymethyl cellulose to form a slurry;
spreading said slurry mixture onto a moving belt;
conveying said slurry into a hydrogen furnace;
subjecting said slurry to conditions of reducing atmosphere and high temperature sufficient to vaporize the water and carboxymethyl cellulose and to sinter the metal powder in order to form a plaque that has pore diameters ranging from about 4 to 15μ;
forming a protoelectrode by cutting the sintered plaque to suitable electrode dimensions;
welding an electrically conductive tab to the top edge of said protoelectrode;
immersing said tabbed protoelectrode in an aqueous solution of 50–60% zinc nitrate at pH 5–5.5;
eliminating air bubbles within the matrix pores by application of a vacuum;
electrochemically depositing zinc within the pores of the plaque at a current rate of 0.75 to 1.0 Amperes per square inch while maintaining the pH at 5.0–5.5, pausing occasionally to allow the solution to refill the pores;
alloying the zinc-loaded plaque in a dilute aqueous solution of a salt of a gas-evolution suppressing metal chosen from the group consisting of mercury lead, tin and thallium until the amount of alloy is 1–2% of such gas-evolution suppressing metal relative to the weight of zinc.

11. The process of claim 10 further comprising:
selecting a metal plaque that is approximately 85% porous, about 0.01 to 0.07 inch thick and has pore diameters in the range of about 4 to 15 microns;
turning off the electrochemical deposition current for about one minute about every ten minutes to allow the solution to refill the pores;
continuing electrolytic plating until the protoelectrode is about 45–55% zinc and about 25–30% void;
immediately washing the wet plate in flowing deionized water until the protoelectrode is at a neutral pH;
immersing the plate in a dilute solution of mercuric acetate until the amalgamation level is 1–2% mercury relative to the zinc;
removing the plated protoelectrode from the amalgamating bath and washing the plate; and
drying the protoelectrode at 100° F. in a forced air oven.

12. An electrode made by the process of claim 11.

13. A rechargeable battery comprising:
at least one negative electrode comprising an essentially electrochemically inert substrate material chosen from the group consisting of nickel, copper and silver and active electrode material comprising zinc alloyed with approximately 1–2% of a gas-evolution suppressing metal chosen from the group consisting of mercury, lead, tin and thallium, said substrate material being in the form of a sintered plaque comprising about 4–15 micron size pores, and said zinc being evenly deposited in said pores;
at least one positive electrode;
at least one semipermeable separator positioned between alternating positive and negative electrodes;
an alkaline aqueous electrolyte solution; and
a battery case.

14. The battery of claim 13 wherein said positive electrode is silver oxide or nickel oxide.

15. The battery of claim 13 wherein said aqueous electrolyte solution is potassium hydroxide.

16. A rechargeable Ni—Zn or Ag—Zn battery comprising:
at least one negative electrode comprising an essentially electrochemically inert substrate material chosen from the group consisting of nickel, copper and silver, said substrate material being in the form of a sintered plaque having a pore size of about 4–15 microns and having a surface area of about 0.25–0.50 sq. meters per gram of substrate material available for zinc deposition;
an active electrode material comprising zinc that has been electrolytically deposited within the pores of said sintered plaque, said zinc being amalgamated with approximately 1–2% of a gas-evolution suppressing metal chosen from the group consisting of mercury, lead, tin and thallium, said zinc-loaded plaque having a residual porosity of approximately 25-30%, and said zinc being deposited within said substrate such that said pores become essentially filled with zinc oxide and/or zinc hydroxide when the battery is discharged;

at least one positive electrode;

at least one semipermeable separator positioned between alternating positive and negative electrodes;

an alkaline aqueous electrolyte solution; and a battery case.

17. An improved rechargeable Ni—Zn or Ag—Zn alkaline battery comprising at least one negative electrode having active electrode material comprising zinc, at least one positive electrode, at least one semipermeable separator positioned between alternating positive and negative electrodes, and an alkaline aqueous electrolyte solution, wherein the improvement comprises:

said zinc being alloyed with approximately 1-2% of a gas-evolution suppressing metal chosen from the group consisting of mercury, lead, tin and thallium; and an anode comprising an essentially electrochemically inert sintered plaque substrate comprising about 4–15 micron size pores, said plaque having been formed from metal powder of particle size ranging from about 2 to 3.5 microns and chosen from the group consisting of nickel, copper and silver, said zinc being evenly deposited in said substrate pores such that said pores become essentially filled with zinc oxide and/or zinc hydroxide upon discharge of the battery.

18. An improved rechargeable Ni—Zn or Ag—Zn alkaline battery comprising at least one negative electrode having active electrode material comprising zinc, at least one positive electrode, at least one semipermeable separator positioned between alternating positive and negative electrodes, and an alkaline aqueous electrolyte solution, wherein the improvement comprises:

said zinc being alloyed with approximately 1-2% of a gas-evolution suppressing metal chosen from the group consisting of mercury, lead, tin and thallium; and an anode comprising an essentially electrochemically inert sintered, finely pored plaque substrate, said plaque having been formed from metal powder of particle size ranging from about 2 to 3.5 microns and chosen from the group consisting of nickel, copper and silver, said zinc being disposed in said substrate pores in such a manner that mobility of the zinc, or an oxide or hydroxide form thereof, is deterred upon discharging of the battery.

* * * * *